(12) United States Patent
Metz et al.

(10) Patent No.: US 8,974,643 B2
(45) Date of Patent: Mar. 10, 2015

(54) METHOD AND DEVICE FOR PURIFYING A LIQUID

(75) Inventors: Sybrand Jacob Metz, Heerenveen (NL); Gerrit Oudakker, Langedijk (NL); Johannes Cornelis Maria Marijnissen, Breda (NL)

(73) Assignee: High Voltage Water B.V. (NL)

( * ) Notice: Subject to any disclaimer, the term of this patent is extended or adjusted under 35 U.S.C. 154(b) by 1307 days.

(21) Appl. No.: 12/448,926

(22) PCT Filed: Jan. 16, 2008

(86) PCT No.: PCT/NL2008/000013
§ 371 (c)(1),
(2), (4) Date: Nov. 2, 2010

(87) PCT Pub. No.: WO2008/088211
PCT Pub. Date: Jul. 24, 2008

(65) Prior Publication Data
US 2011/0042199 A1   Feb. 24, 2011

(30) Foreign Application Priority Data

Jan. 18, 2007   (NL) .................................... 1033253

(51) Int. Cl.
*C02F 1/12*   (2006.01)
*C02F 1/48*   (2006.01)
*B01D 1/16*   (2006.01)
*B01D 1/20*   (2006.01)
*B01D 3/00*   (2006.01)
*B01D 5/00*   (2006.01)
*B01D 1/00*   (2006.01)

(52) U.S. Cl.
CPC ................ *C02F 1/12* (2013.01); *B01D 1/0017* (2013.01); *B01D 5/006* (2013.01); *Y10S 159/01* (2013.01); *Y10S 159/26* (2013.01); *Y10S 203/11* (2013.01)
USPC ........... 203/10; 159/3; 159/48.1; 159/DIG. 1; 159/DIG. 26; 204/155; 204/164; 202/182; 202/202; 202/236; 203/25; 203/27; 203/90; 203/100; 210/243; 210/652; 210/748.01

(58) Field of Classification Search
USPC ................... 159/3, 26.1, 27.3, 28.1, 46, 48.1, 159/DIG. 1, DIG. 26; 204/155, 164, 450; 202/182, 202, 236, 237; 203/10, 25, 203/27, 90, 100, DIG. 8; 210/243, 652, 210/748.01
See application file for complete search history.

(56) References Cited

U.S. PATENT DOCUMENTS 2,929,770 A * 3/1960 Wennerberg .................. 204/665
3,455,790 A   7/1969 Marks
(Continued)

FOREIGN PATENT DOCUMENTS

ES          2 122 866 A1   12/1998
WO   WO 2004/076057      9/2004

OTHER PUBLICATIONS

International Search Report, completed Jun. 26, 2008, and mailed on Jul. 4, 2008, in International Application No. PCT/NL2008/000013.

*Primary Examiner* — Virginia Manoharan
(74) *Attorney, Agent, or Firm* — Medlen & Carroll, LLP

(57) ABSTRACT

The present invention relates to a method for purifying a liquid comprising liquid particles and residual particles. It is hereby possible to generate substantially pure water from, for instance seawater.

14 Claims, 4 Drawing Sheets

(56) References Cited

U.S. PATENT DOCUMENTS

| | | | |
|---|---|---|---|
| 3,518,461 A * | 6/1970 | Marks | 310/10 |
| 3,616,460 A * | 10/1971 | Watson et al. | 204/665 |
| 4,206,396 A * | 6/1980 | Marks | 322/2 A |
| 4,339,307 A * | 7/1982 | Ellis, Jr. | 202/176 |
| 4,433,248 A * | 2/1984 | Marks | 290/44 |
| 4,634,510 A * | 1/1987 | Mintz et al. | 204/561 |
| 4,892,139 A * | 1/1990 | LaHaye et al. | 165/95 |
| 4,953,694 A * | 9/1990 | Hayashi et al. | 202/180 |
| 5,056,593 A * | 10/1991 | Hull | 165/111 |
| 5,203,993 A | 4/1993 | Arbisi | |
| 5,423,964 A * | 6/1995 | Smith et al. | 204/452 |
| 5,846,301 A * | 12/1998 | Johnson et al. | 96/52 |
| 6,051,111 A * | 4/2000 | Prestidge | 203/11 |
| 6,649,907 B2 * | 11/2003 | Ebeling et al. | 250/288 |
| 7,160,469 B2 * | 1/2007 | Mayer et al. | 210/695 |
| 7,410,611 B2 * | 8/2008 | Salbilla | 422/22 |
| 7,628,893 B1 * | 12/2009 | Bonser et al. | 203/2 |

\* cited by examiner

METHOD AND DEVICE FOR PURIFYING A LIQUID

CROSS-REFERENCE TO RELATED APPLICATIONS

The present application, as a national state application, claims the benefit of PCT Application No. PCT/NL2008/000013, filed Jan. 16, 2008 and foreign priority to Netherlands Application No. 1033253, filed Jan. 18, 2007, which are both incorporated herein by reference.

The present invention relates to a method for purifying a liquid comprising liquid particles and residual particles. It is hereby possible to generate substantially pure water from for instance seawater.

A known system for desalinating seawater, and thereby converting it into fresh water, is membrane distillation. Here salt water is heated, wherein the water evaporates and passes through a membrane, after which the water vapour condenses on a relatively cool condensation surface and relinquishes the heat to the salt water to be heated. The condensation is then discharged as substantially pure fresh water.

The use of membranes is a costly aspect of the whole purification process. Not only are the membranes expensive to produce and purchase, the membranes are also susceptible to contamination, whereby they begin to operate less efficiently. An additional problem is that many membranes are essentially sensitive to temperature and, particularly at higher temperatures, become less efficient in use. The evaporation of the liquid further requires a great deal of energy.

The present invention has for its object to provide a method for purifying a liquid, wherein the purification is performed in a more efficient manner.

The present invention provides a method for purifying a liquid comprising liquid particles and residual particles, comprising the steps of:
 heating the liquid with liquid particles and residual particles for purifying;
 carrying the liquid in the form of liquid droplets into a purification space;
 applying a similar electric charge to the liquid droplets and to a condensation surface;
 evaporating liquid particles in the purification space;
 condensing the evaporated liquid particles on the condensation surface;
 discharging the condensation and the unevaporated residual particles separately.

Liquid can evaporate efficiently by heating the liquid for purifying and distributing or vapourizing this heated liquid in a purification space. Applying electric charge to the liquid droplets achieves that the droplets become unstable. Once the critical point has been passed, these droplets are then distributed as a type of mist of charged particles. These particles have a diameter in the order of magnitude of 10 μm or even smaller. The process ("Electro-Spraying") of vapourizing the particles can also be repeated. Liquid evaporates from the particles. An efficient evaporation process is hereby obtained. The evaporated liquid will then seek a surface on which to condense. Applying a charge to the condensation surface similar to that on the residual particles achieves that the residual particles of the liquid are repelled by the condensation surface and only the evaporated liquid particles will condense on this condensation surface. The condensation surface will here have a lower temperature than the particles. A substantially pure liquid flow is obtained by then collecting the condensation and discharging it separately. The unevaporated residual particles are discharged as a residual flow. The applying of said charge has the result, among others, that no membrane is required to separate the evaporated liquid particles from the residual particles. An advantageous process is hereby obtained, the operation of which is not diminished through use as a result of for instance contamination. In an advantageous embodiment the liquid is seawater which is purified into fresh water suitable for consumption.

In a preferred embodiment according to the invention the evaporated liquid particles are guided to the condensation wall.

By guiding the liquid particles to the condensation wall a greater part of the liquid for purifying is separated from the residual particles. This guiding can take place by making use of an extra gas flow and/or a pressure difference. A greater output can hereby be realized from the process. An additional advantage is that the residual flow will comprise fewer liquid particles and will therefore be smaller, with for instance a higher concentration of salt.

In a preferred embodiment according to the invention the step of heating a liquid comprises of carrying the liquid though a heat exchanger and further heating the liquid with an external source.

Owing to the use of a heat exchanger to heat the liquid use can be made of the energy released from, among others, the condensation process and/or the remainder of the residual flow. An external energy source is necessary for the purpose of supplying extra energy in order to maintain the process. In an advantageous embodiment this energy source is embodied as an additional heat exchanger. Energy in the form of heat can be supplied to the liquid in relatively simple manner by using a heat exchanger. The heat exchanger can for instance obtain this heat in the form of a residual energy originating from another process preferably located nearby. Use can herein also be made for instance of solar energy. The heating of the liquid preferably takes place in counter-flow to the evaporation, condensation and/or discharge. The use of the energy required for the process is hereby managed most efficiently. A positive charge is further preferably applied to both the liquid droplets and the condensation surface. The most efficient use is hereby made of properties of the substances involved.

In a preferred embodiment according to the invention the residual particles are repelled by the condensation surface and attracted by a discharge wall to which a charge opposite to that on the condensation wall is applied.

By applying the charge to the liquid and to the condensation surface the residual particles in the liquid are repelled by this condensation surface. The direction of the flow of residual particles can further be directed by the use of a discharge wall to which a charge opposite to that on the condensation wall is applied. The residual particles are hereby attracted and the purification of the liquid is further improved. The charge can be applied by making use of one or more power sources. The discharge wall can for instance also be provided with a charge by an process of induction.

In an advantageous preferred embodiment according to the invention the residual flow is used for energy generation by making use of the pressure difference between salt and fresh water.

A membrane potential is set by for instance making use of an ion-selective membrane which separates salt water from fresh water. This potential amounts to about 80 mV. The small voltage difference can optionally be increased by placing a plurality of compartments in series in order to use a greater voltage difference, whereby electricity can be generated. By using the highly concentrated salt residual flow for this purpose a relatively high voltage difference can be realized using a membrane, whereby electricity can be generated in more efficient manner by making use of this residual flow.

The present invention further also relates to a device for purifying a liquid. The device provides the same effects and advantages as those stated with reference to the method. In an advantageous embodiment of the device according to the invention a double-walled cylinder is provided as heat exchanger and condensation surface. Through the use of a double-walled cylinder the incoming, liquid flow can for instance be heated by the outer edge, after which evaporation, condensation and discharge of the separated flows takes place through the centre of the cylinder. The incoming liquid flow can of course also be guided through the centre of the cylinder and the discharge through the outer edge. An advantageous device can be realized in efficient manner with such a double-walled cylinder.

In a further preferred embodiment the liquid for purifying is heated to about 200° C. in order to intensify the evaporation step.

By heating the liquid for purifying above 100° C., for instance by applying a higher pressure, the heat content of the liquid flow is increased. A greater part of the water will hereby evaporate in the evaporation step. The optimum temperature depends on the specific process conditions, such as magnitude of flow rates, heat-exchanging surfaces and so on. The temperature of the liquid for purifying will preferably be brought above 100° C., to about 125° C., more preferably to about 150° C., and most preferably to 200° C. or even higher. It will be apparent that, when the temperatures are too high, among other things the heat loss will become so great that the process will progress less efficiently.

Further advantages, features and details of the invention are elucidated on the basis of a preferred embodiment, wherein reference is made to the accompanying drawings, in which.

Figure 1:
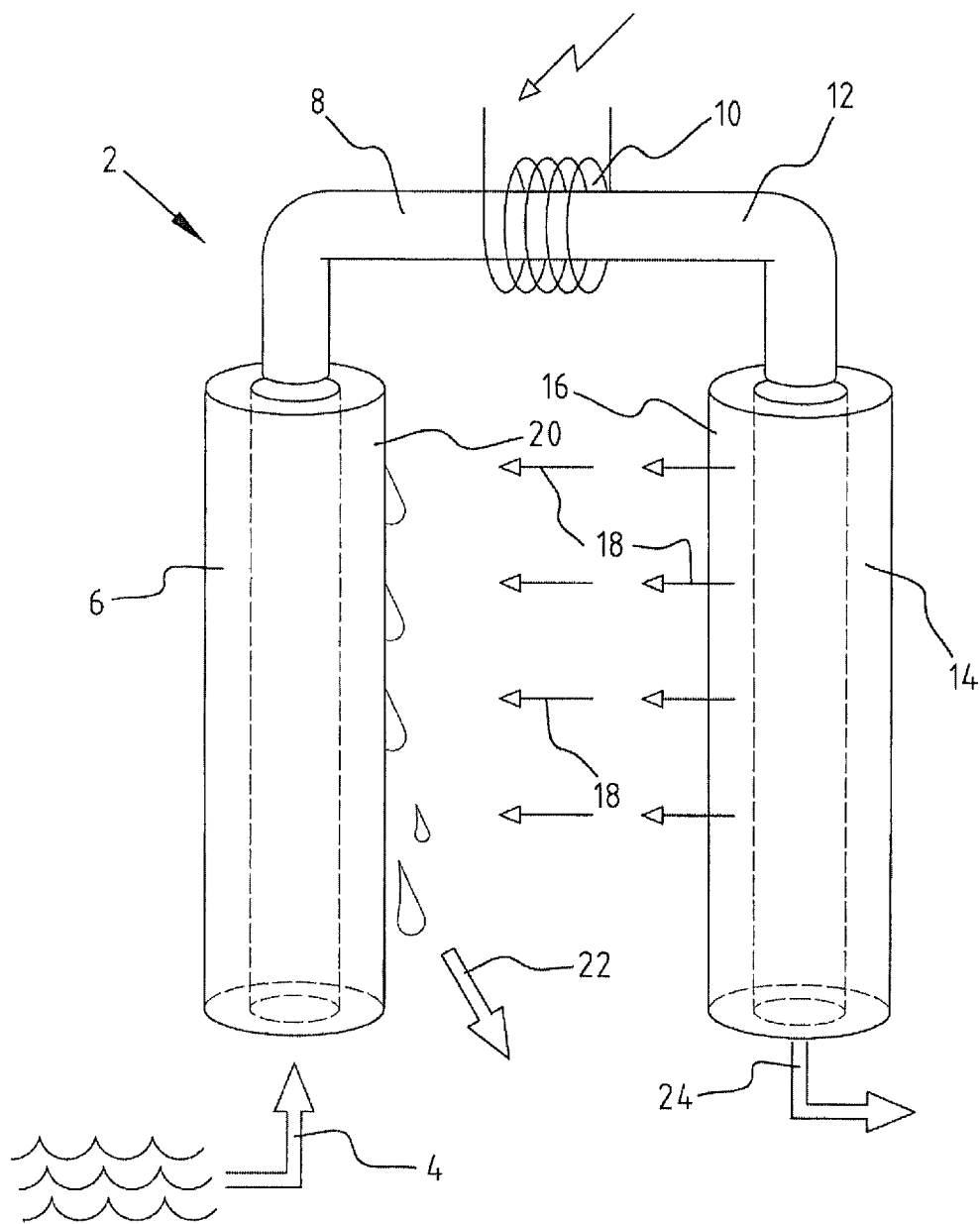
FIG. 1 shows a schematic view of a known principle for purifying liquid.

A device 2 for purifying a liquid (FIG. 1) takes up a salt flow 4, such as seawater. Such a flow 4 comprises about 35 g of salt per liter of salt water. On the inlet side this salt water has a temperature of for instance 25° C. In a non-porous tube 6 the liquid is heated to a temperature of about 80° C. of the outgoing flow 8. This flow 8 is further heated by a heating element 10, and this results in an extra-heated flow of about 95° C. The extra-heated flow 12 then enters a porous tube 14. Due to the high temperature water will evaporate and come to lie on a relatively cold condensation surface 20 as water vapour flow 18 through openings 16 in the membrane or porous tube 14. This pure condensed water is discharged for further use as pure water flow 22. The residual particles of the liquid flow which do, not pass through openings 16 in, the membrane or porous tube 14 are discharged as a residual flow 24. During the passage of water vapour flow 18 to condensation surface 20 a small underpressure can optionally be employed in order to facilitate this passage.

Device 26 according to the invention (FIG. 2) takes up and carries salt water 28 through tube 30. The water flow is herein heated from about 25° C. of ingoing flow 28 to about 80° C. of outgoing flow 32. This flow 32 is then further heated by heating element 34 to form extra-heated flow 36. This extra-heated flow 36 has a temperature of about 95° C. Flow 36 is carried to a sprayer or vaporizer 38. Sprayer 38 is provided with a needle-shaped outflow (not shown). The sprayer is connected to a charge source 40 via connection 42. Charge source 40 provides the liquid in the sprayer with a charge by applying an electric voltage. Flow 36 is then distributed over droplet flows 44 by sprayer 38. Water from these droplets can evaporate and is carried by fan 47 in the direction of condensation surface 48 as water vapour flow 46. Condensation surface 48 is provided with the same charge as sprayer 38 by the charge source 50 by means of connection 52. Only the flow of water vapour 46 will condense onto condensation surface 48 and the residual particles will be discharged as residual flow 54. The residual particles are attracted by a plate 56, which is provided with a charge by source 58 by means of connection 60. The charge on plate 56 is opposite to the charge of condensation wall 48. Alternatively, the charge on plate 56 can be obtained by induction. Flow 44 can be directed by making use of a fan 49. Use can here be made of air or another gas.

Due to the high temperature of droplet flow 44 water can evaporate and then condense onto the cold surface 48. This process takes place in a space 61. The heat released during this condensation is used to heat ingoing flow 28. The outgoing flows have a temperature of about 28° C. In the shown embodiment about 10% of the water will for instance evaporate in a single purification step, depending of course on the process parameters.

Figure 2:
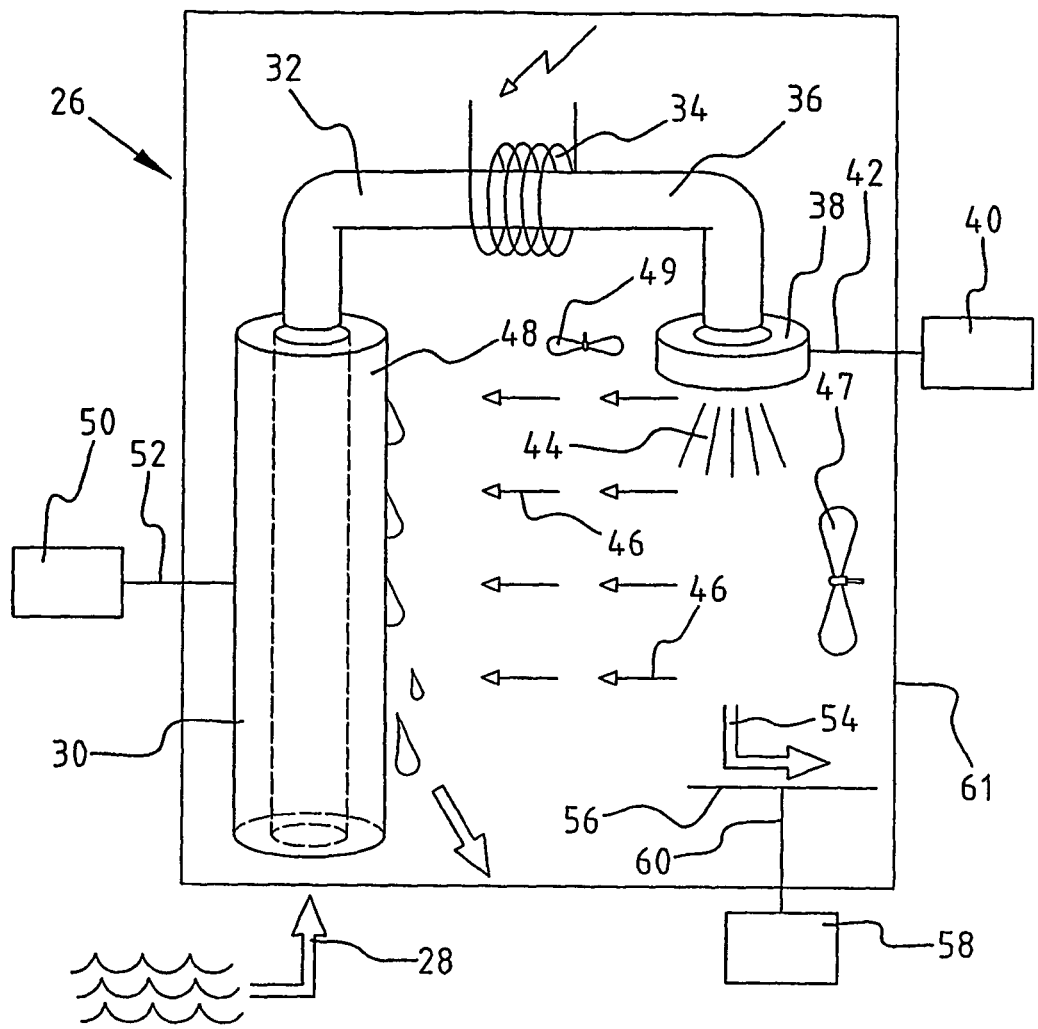
FIG. 2 shows a schematic view of the method according to the invention.
Figure 3:
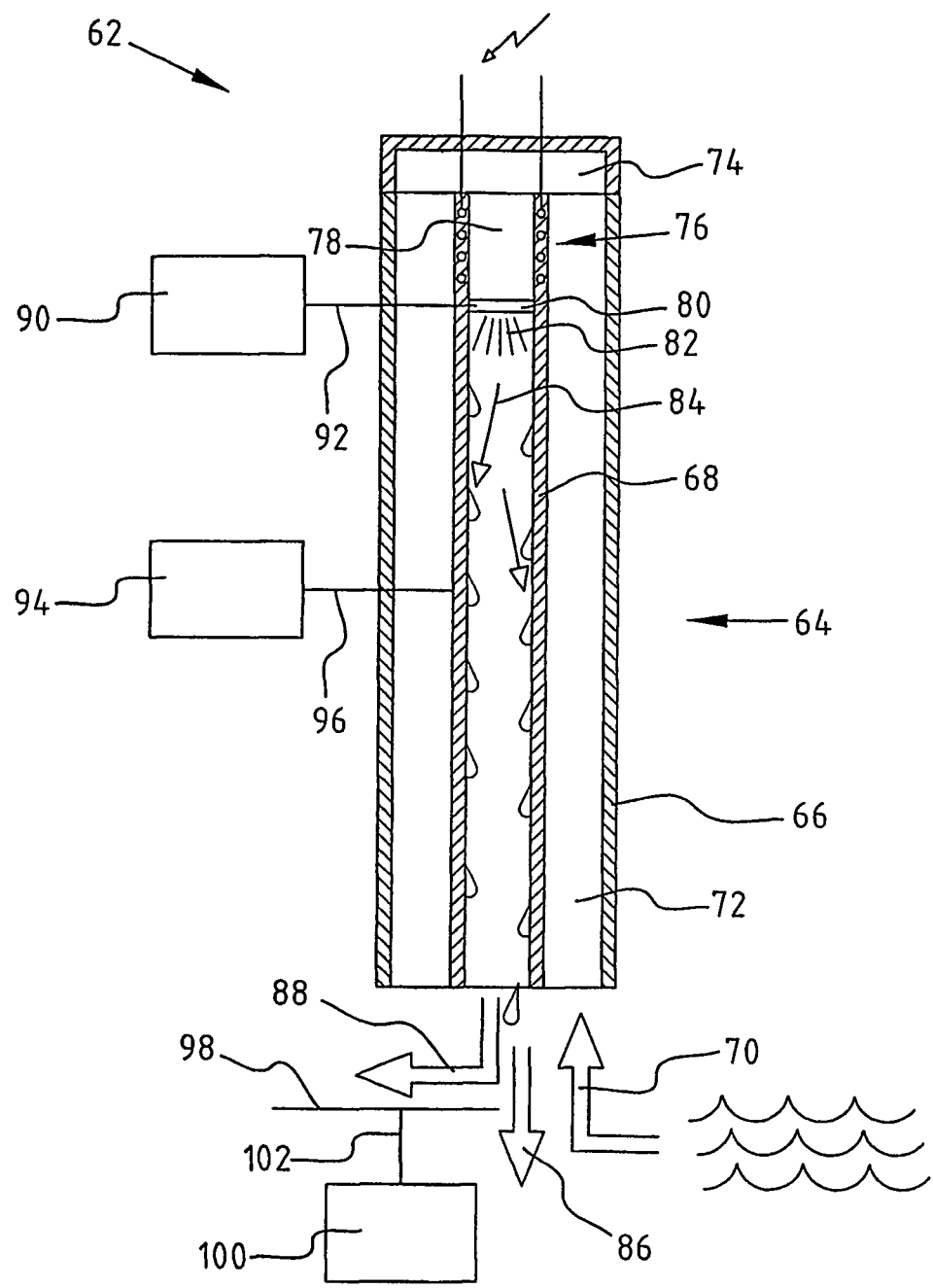
FIG. 3 shows a schematic view of an embodiment according to the diagram of FIG. 2.

A device 62 for purifying a liquid (FIG. 3), as according to the operation shown in FIG. 2, is formed by a double-walled cylinder 64. This cylinder 64 has an outer wall 66 and an inner wall 68. An ingoing flow 70 formed by seawater flows through a passage 72 formed by outer wall 66 and inner wall 68. Outgoing flow 74 is further heated by a heating element 76, resulting in an extra-heated flow 78. Hot flow 78 is carried to sprayer 80, which distributes flow 78 as a droplet flow 82. Water can evaporate from this flow 82 and forms a flow of water vapour 84 which will condense on the relatively cold inner wall 68. The condensation is collected and carried further as pure water flow 86. The remaining particles are carried further as residual flow 88. Sprayer 80 is connected to charge source 90 via connection 92. Inner wall 68 is connected to voltage source 94 via connection 96. Residual flow 88 is collected by collecting wall 98, which is connected to a power source 100 via connection 102.

The ingoing flow is heated from a temperature of 25° C. to about 80° C. at outgoing flow 74. Due to the additional heating the extra-heated flow 78 has a temperature of about 95°. The heating from 25° C. to 80° C. can be achieved by making use of the released condensation heat and the cooling of the flows on the inner side of the double-walled cylinder. Flows 86 and 88 cool from 95° C. close to sprayer 80 to about 28° C. when leaving device 62. Power sources 90 and 94 apply the same charge to sprayer 80 and inner wall 68, wherein inner wall 68 functions as condensation surface. Discharge wall 98 is on the other hand provided with an opposite charge by power source 100. The residual particles are hereby attracted by this wall and will not deposit against condensation wall 68. Pure separation of residual flow 88 and pure water flow 86 can hereby be realized. Flows can optionally be forced by fans and/or for instance pressure differences.

Figure 4:
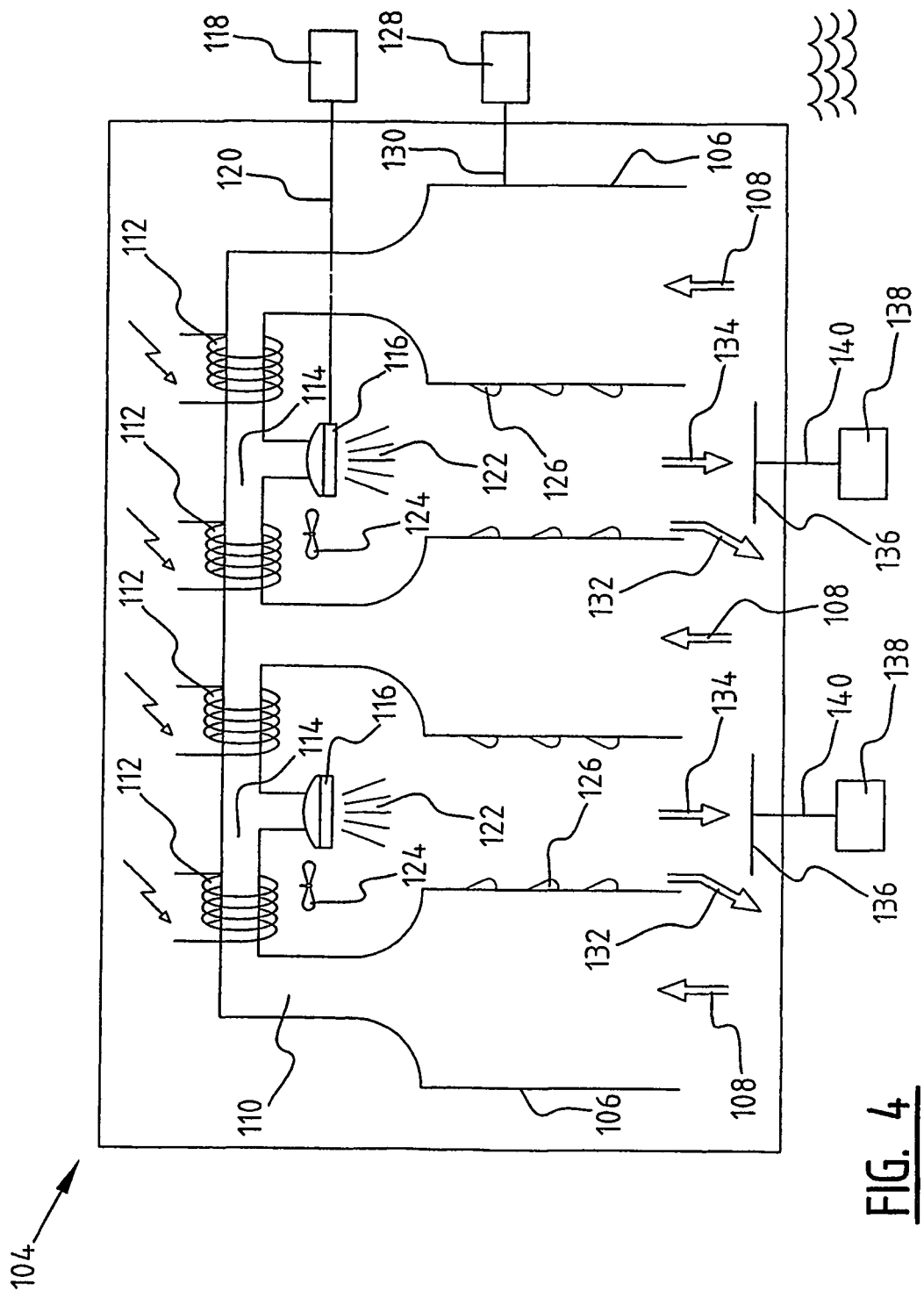
FIG. 4 shows an alternative embodiment, connected in parallel, of the purification according to the invention.

In an alternative embodiment of the purifying process the device 104 (FIG. 4) is provided with a number of plates 106. An ingoing flow 108 is carried alternately between these plates or tubes/cylinders 106. This flow is heated by the released condensation heat in the purification spaces provided between ingoing flows 108. Ingoing flow 108 is carried to sprayer 116 by means of conduits 110, via one or more heating elements 112 and conduits 114. This sprayer 116 is provided with charge from a charge source 118 via connection 120. The sprayers can herein be provided with charge from one charge source 118 or each be provided with their own source. The vapourized flow 122 is directed by a fan 124. Liquid will evaporate and come to lie in a flow 126 on plates 106, where condensation takes place on the relatively cold surface. Plates 106 are provided with charge from energy source 128 via connection 130. The condensation is discharged with condensation flow 132. Residual flow 134 comes to lie on plate 136, which is provided with a charge from energy source 138 via connection 140. The further operating principle is the same as that in the above discussed embodiments.

The present invention is in no way limited to the above described preferred embodiment; the rights sought are defined by the following claims, within the scope of which many modifications can be envisaged. It is thus possible for instance to combine the power sources into one source, such as power sources 90 and 94 of FIG. 3. It is further possible to make use of the earth's electric field, for instance by bringing sprayer 80 to the voltage of higher air layers. In order to apply a voltage use can for instance also be made of a Kelvin pot, wherein falling water droplets are used to generate voltage differences, making use of electrostatic induction which occurs between two mutually connected and oppositely charged sub-systems. Although the charge can be applied to the liquid droplets in sprayer 38, it is for instance also possible to envisage applying the charge to the vapourized flow. In further directing or guiding of the flows, such as for instance flow 44 and/or 46, use can be made of underpressure in addition or as alternative to the use of the fans. It is also possible for instance to use the residual flow to generate electricity by means of "Reverse Electro-Dialysis" by bringing salt and fresh water into contact by means of ion-selective membranes. The residual flow can also, be used in a different way for energy generation, such as for instance by means of "pressure-retarded osmosis". Other methods are otherwise also possible. This energy can then for instance be used again for heating elements 76 in order to realize an even more advantageous purification therewith. It is further possible to envisage bringing for instance flow 36 to a high pressure in order to enable the evaporation process to then take place efficiently. In a possible alternative configuration of the system a plurality of purifying processes are performed in parallel. This gives the overall system a greater capacity. Use can also be made here of opposite charges in different parallel sub-systems. This has the additional advantage that an equal number of similarly charged particles are obtained. In a possible alternative configuration a plurality of purifying steps is carried out sequentially and/or iteratively. Purer flows can hereby be obtained. A combination of these configurations is of course also possible.

The invention claimed is:

1. Method for purifying a liquid comprising:
    a) heating a liquid comprising a salt flow with at least one heating element;
    b) spraying the heated salt flow to form a liquid droplet flow and residual particles;
    c) applying an electric charge to both the liquid droplet flow and to a condensation surface;
    d) evaporating the liquid droplet flow wherein a water vapor flow and a residual particle flow are created;
    e) forming a condensate on the condensation surface with the water vapor flow; wherein the water vapor flow is guided to the condensation surface, and wherein the residual particle flow is repelled by the condensation surface; and
    f) discharging separately the condensate and the residual particle flow, wherein the condensate is discharged through the condensate surface.

2. The method as claimed in claim 1, wherein the salt flow comprises salt water.

3. The method as claimed in claim 1, wherein the heating of the liquid takes place before the evaporating, condensing and discharging steps.

4. The method as claimed in claim 1, wherein the electric charge is positive.

5. The method as claimed in claim 1, wherein the residual particle flow is attracted by a discharge wall comprising an electric charge opposite to that on the condensation surface.

6. The method as claimed in claim 1, wherein the method further comprises generating energy from the residual particle flow by a technique selected from the group consisting of pressure-retarded osmosis and reverse electro-dialysis.

7. The method as claimed in claim 1, further comprising intensifying the evaporating wherein the liquid droplet flow is heated to about 200° C.

8. The method as claimed in claim 1, wherein the at least one heating element is a heat exchanger.

9. The method as claimed in claim 1, wherein the salt flow is further heated with an external source.

10. The method as claimed in claim 1, wherein the heating ranges about 80-95° C.

11. A device comprising:
    a) a tube comprising a first portion and a second portion wherein the first portion comprises a condensation surface, and the second portion comprises a sprayer;
    b) a heating system comprising a heat exchanger wherein heat is released by a water vapor flow contacting the condensation surface and a heating element connected to the second portion;
    c) a first charge source connected to the sprayer and a second charge source connected to the condensation surface, wherein the first and second charge sources have the same charge;
    d) a condensate discharge system connected to the condensation surface; and
    e) a residual flow discharge system comprising a third charge source with a charge that is opposite the first and second charge source charge.

12. The device as claimed in claim 11, wherein the tube and condensation surface forms a double-walled cylinder.

13. The device of claim 12, wherein the double-walled cylinder comprises the heat exchanger and the condensation surface.

14. The device of claim 11, wherein the heating element is a heat exchanger.

* * * * *